APPARATUS FOR SECURING COMPONENTS TO PANELS

Filed July 20, 1955 2 Sheets-Sheet 1

Inventor:
Walter Stuhre
by Howson & Howson
Attys.

July 7, 1959 W. STUHRE 2,893,010

APPARATUS FOR SECURING COMPONENTS TO PANELS

Filed July 20, 1955 2 Sheets-Sheet 2

Inventor:
Walter Stuhre
by Howson & Howson
Attys.

United States Patent Office 2,893,010

Patented July 7, 1959

2,893,010

APPARATUS FOR SECURING COMPONENTS TO PANELS

Walter Stuhre, Horsham, Pa., assignor to Philco Corporation, Philadelphia, Pa., a corporation of Pennsylvania Application July 20, 1955, Serial No. 523,188

4 Claims. (Cl. 1—210)

Figure 1:
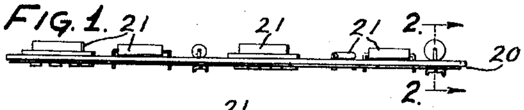

The invention hereinafter described and claimed relates to electrical apparatus, being especially concerned with the making of electrical connections between circuit components and the relatively flat, ribbon-like conductors which characterize circuits of the so-called "printed" type. In such circuits the various components of the equipment—which may, for example, take the form of radio or television receiving equipment—are interconnected by conductive strips affixed directly to a mounting panel in accordance with a predetermined circuit diagram, and it has been a primary object of my invention to improve the operation by which the components are affixed and soldered to the panel, and also to improve the product consisting of the panel with the conductively secured components.

Printed circuits, per se, are well-known, having been applied to mounting panels in a variety of different ways, and having gone into wide commercial use. At an early stage in the development of this art the lead wires extending from the components were held, mechanically, in juxtaposition to terminal portions of the printed circuitry, and the necessary electrical connections were made by soldering the lead wires, individually to the said terminal portions. As will be appreciated, this technique is both laborious and expensive and, to a large extent, has been superseded by a method in which all of the terminal connections are made simultaneously by dipping the panel (the lead wires first having been temporarily secured in place, as for example by crimping) into a bath of molten solder.

The affixment of the lead wires against the face of the panel prior to soldering has ordinarily been accomplished by a stapling operation in which these leads were bent in their common plane, in opposite directions against their terminal connection printed panel positions. Certain difficulties have been encountered in manufacture and use of panels assembled and secured by these methods, and the basic purpose of the present invention has involved elimination of these difficulties.

One problem encountered in manufacture of printed panels with assembled components by the above-discussed methods has been that the components have not been affixed to the panels with the desired firmness and rigidity, for performance of the soldering operation and the setting of the solder. As a consequence, relative movement between the component and panel has occurred before the solder has set, with the production of so-called cold solder joints; i.e., joints which have been weakened by movement during congelation. Such joints are objectionable not only because they involve a weak and hence dangerous connection, but also because they provide inadequate and erratic electric conductivity.

A primary object and feature of the invention has accordingly been to provide a crimped connection in which the parts are firmly affixed to each other with exactly the desired relative positioning prior to soldering.

Another problem encountered with stapled connections of the prior art has been that it has been difficult to remove the components in cases in which this latter became necessary in repair of the appliance. A further object and feature has accordingly been to provide a connection which may be more readily removed when desired, than could the stapled connections of the prior art.

A further object and feature has been to provide an irregular wire surface of substantial longitudinal extent to provide a projection to which solder will adhere more effectively than in prior soldered joints in this field.

Figure 2:
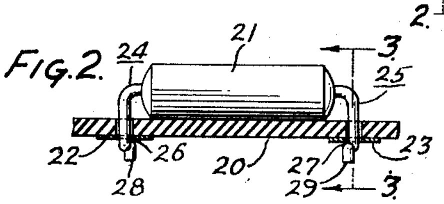
Figure 3:
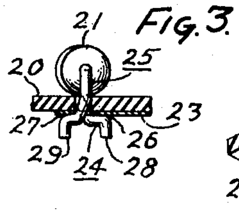
Figure 5:
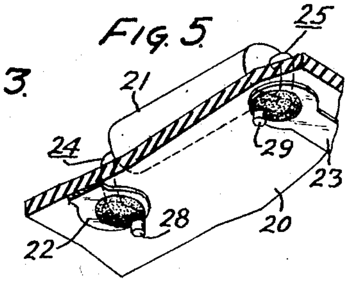
Figure 4:
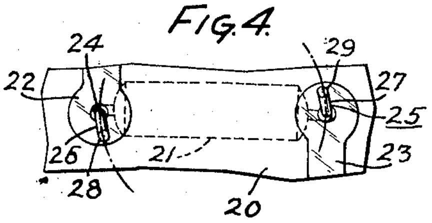
Figure 7:
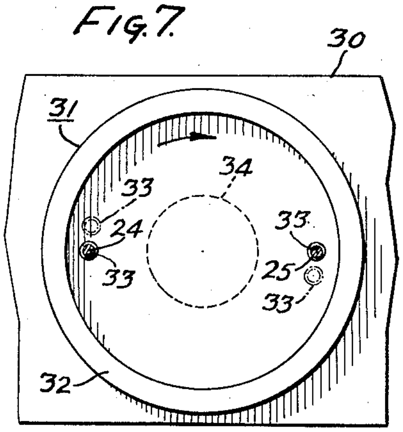
Figure 6:
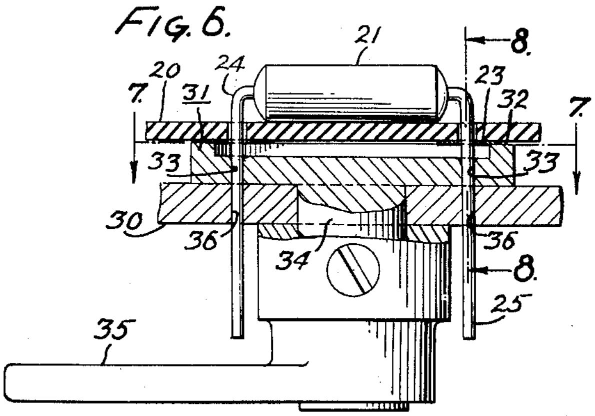
Figure 8:
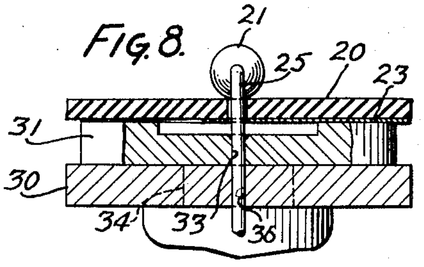
Figure 10:
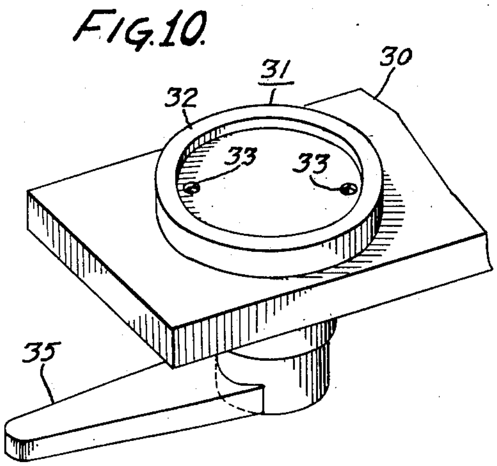
Figure 9:
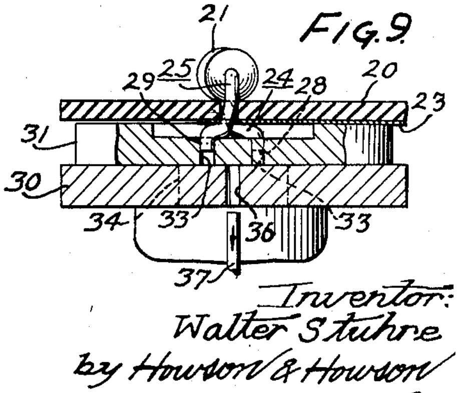
Figure 11:
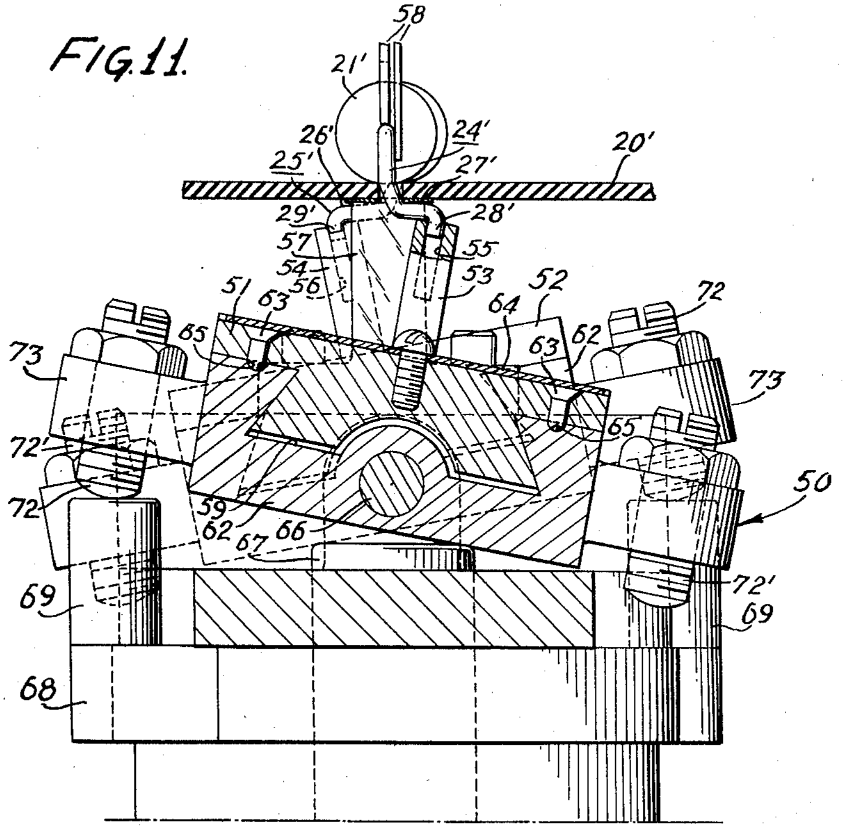
Figure 12:
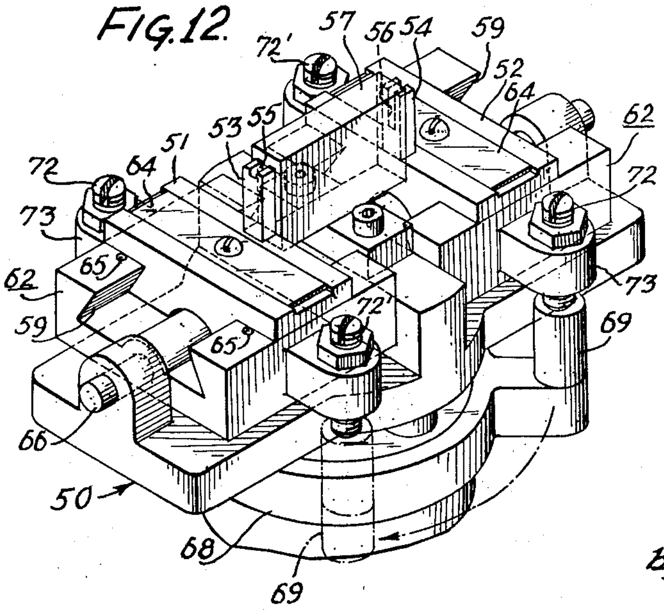
Figure 13:
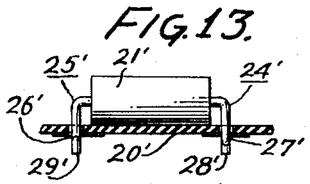
Figure 14:
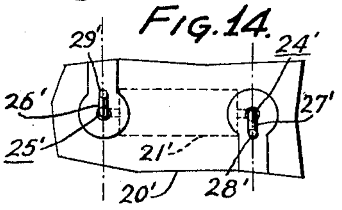

Still further objects and features of the invention, and the manner in which they have been attained, will be evident from reading of the following detailed description in the light of the attached drawing, in which, Figure 1 is a side elevation of a panel, with components affixed in place by crimping in accordance with the invention, Figure 2 is a cross-section on the line 2—2 of Figure 1, Figure 3 is a cross-section on the line 3—3 of Figure 2, Figure 4 is a bottom plan view illustrating the crimped connection of Figures 2 and 3, Figure 5 is a detailed bottom view of the connection, partly in perspective and partly in cross-section, showing the lead wires soldered in place, Figure 6 is a cross-section through a panel with assembled component and a crimping tool, illustrating the first step in the crimping operation, Figure 7 is a plan view looking from the line 7—7 of Figure 6, Figure 8 is a cross-section on the line 8—8 of Figure 6, Figure 9 is a view similar to Figure 8, illustrating completion of the crimping operation, Figure 10 is a perspective view of the crimping tool used in practice of the process of Figures 1 to 9, Figure 11 is a cross-section through an alternative type of crimping tool, illustrating its use in practice of the process of the invention, Figure 12 is a top perspective view of the tool of Figure 11, Figure 13 is a cross-section corresponding to Figure 2, but illustrating the modified form of crimped connection obtained by the apparatus and process of Figure 11, and Figure 14 is a bottom plan view of the connection of Figure 13.

As illustrated in Figure 1, the panel 20 has secured to its rear side a plurality of components 21, with lead wires extending through holes in the panel and crimped over against the terminals 22 and 23 of the printed wiring pattern, i.e., into relationship with these terminals which will establish through the interconnected component the desired permanent electrical connection between the terminals, when the parts are soldered in place.

As discussed above, the invention provides a crimped connection and method of forming it by which the components 21 are drawn firmly into their fixed positions against the rear side of the panel and secured in those positions without any possibility of movement except by deliberate detachment. This may best be understood by reference to Figures 2 to 5 of the drawing. In the present invention, as in prior art practice, the lead wires 24 and 25 project downwardly through holes in the panel. However, in past practice, the affixment of these wires with the interconnecting component has been accomplished by a stapling operation in which the projecting ends of these wires have been bent directly toward or directly away from each other and against the printed terminals on the face of the panel, in the common plane of the two projections. This has resulted in a connection which was insecure, and which, even more seriously, entailed a certain amount of looseness, especially axially of the component.

The present invention involves a connection in which the projecting end of lead wire 24 is crimped at 26 against its terminal connection 22 in a direction which is lateral, and preferably substantially at right angles, to the common plane of the depending projections of wires 24 and 25, and in which the projecting end of wire 25 is also crimped at 27 laterally against the terminal 23, but in the opposite direction to the crimping of wire 24. By this opposed crimping at the two ends, the component is drawn down against panel 20 very securely, and the oppositely crimped ends resist and prevent the slight axial rotation which has resulted in difficulty in soldering and use, in printed panel assemblies of the prior art.

As a further feature of the invention, the projecting wire ends are bent angularly away from the plane of the panel at 28 and 29, in a direction which may be substantially perpendicular thereto, beyond the ends of the crimped portions 26 and 27. These projecting ends are advantageous for two reasons. In the first place they provide, with crimped portions 26 and 27, a long and irregular surface against which the solder may adhere and congeal in uniting the parts. In the second place, their projection from the plane of the panel makes them easier to locate, grasp and remove, if and when it may become necessary to replace the component in repair of the appliance.

After all of the components have been affixed to the panel as illustrated in Figure 1, these may be permanently secured in place by soldering—by dipping the panel, face down, against the upper surface of a bath of solder. This operation may be performed as in the prior art, or in accordance with any preferred procedure.

Figures 6 to 10 illustrate the method and apparatus of my invention for producing the crimped connections of Figures 1–5. The process may be practiced by simultaneous or consecutive use of crimping tools of the type illustrated in Figure 10, and these may be operated manually or through suitable mechanical connections. This tool may comprise a supporting plate or arm 30 on which the crimping die or member 31 is mounted. The crimping member 31 may be provided with an annular flange 32 to provide a seat or support against the panel 20, and to provide space within which the wires are crimped over. The height of this flange should be slightly greater than the diameter of the lead wires. Member 31 is provided with a pair of holes 33, countersunk at their upper ends and spaced apart to receive the projecting ends 24 and 25 of the component 21. A central shaft 34 depends from the crimping member 31 between these hole locations, and projects through a circular opening in support 30 to journal the crimping member 31. An operating lever or handle 35 is secured to the depending end of shaft 34, to rotate the crimping member upon its support. Support 30 is provided with holes 36 which are aligned with holes 33 in the initial positioning of the tool to receive wires 24 and 25, and any portions of these wires which may project below the lower end of member 31 will accordingly be received within the holes 36.

In the use of the tool for crimping, the parts are first relatively positioned as illustrated in Figure 6, with component 21 in place on panel 20 and its lead wires 24 and 25 projecting through holes 33 and into holes 36. The handle 35 is then rotated through a small arc to move holes 33 from the full line to the dotted line positions of Figure 7, while the panel and arm 30 are held stationary. This results first in severing the ends 37 of wires 24 and 25 which project below member 31 and then in oppositely crimping these lead wires as illustrated. From Figure 9 it will be seen that the ends of the wires remaining in holes 33 after the partial rotation of member 31 will be the projecting parts 28, and that the crimped over lengths 26 and 27 will be formed between these ends and the portions depending perpendicularly through panel 20, by the wiping action of the member 31 through its holes 33 receiving the wires. After formation of the wires to the positions of Figure 9, the crimping tool is withdrawn from the panel in the direction of its axis. After securement of all of the components in this manner, they may be soldered to the panel simultaneously by the dip soldering operation, as discussed above.

It will be seen that the lateral bending of the crimped portions in this form of the invention is on the arc of a circle having its center at the center of shaft 34. In the form illustrated in Figures 11 to 14, the crimping is along a straight line instead of being arcuate. Thus, the crimped portions 26′ and 27′ formed on lead wires 25′ and 24′ in the form of Figures 13 and 14 extend in planes which are at right angles to the common plane of the portions of these wires adjacent the components 21′ themselves, and the extending ends 28′ and 29′ extend angularly from these crimped portions. In the crimping of these component wires in place, the method and tool somewhat schematically shown in Figures 11 and 12 may be employed.

In the operation of the tool 50 of Figures 11 and 12, as in the previously-described form, the ends of the lead wires are initially received within aligned holes in crimping members which are later given a small arcuate movement to effect the crimping, but in this case separate crimping members 51 and 52 rotating in opposite directions are employed, and the rotation is about an axis parallel to the plane of the panel 20′. The individual crimping members carry crimping dies 53 and 54 having slots 55 and 56 which receive the respective ends of lead wires 24′ and 25′ projecting through paned 20′. A platen 57 is secured to the top of the central part of the tool and abuts the underside of the panel, in opposition to holding and positioning members 58 by which the components 21′ are held in position on the rear or upper side during crimping.

The crimping members 51 and 52 are mounted for lateral sliding movement within grooves 59 of tool holders 62, and are secured in their lateral positions of adjustment by studs 63 which are pressed by leaf springs 64 into sockets 65 on holders 62, at spaced locations corresponding to the desired positions of adjustment of the crimping members. The opposed crimping movements of the holders 62 with their crimping members 51 and 52 and dies 53 and 54, is obtained by imparting a slight arcuate movement to these members in opposite directions about shaft 66, as illustrated by the arcuately separated positions of dies 53 and 54 in Figure 11. To maintain both crimping members normally centered in alignment with the holes in the panel 20′, abutments 67 normally underlie the flat under surfaces of holders 62 under spring pressure. When the crimping operation is to be performed, ring 68 is moved upwardly relative to the above-described parts to cause the diagonally-oppositely mounted studs 69 to abut screws 72 which are adjustably mounted in lugs 73 extending laterally from opposite sides of holders 62, to rock the crimping dies simultaneously in opposite directions. If and when it is desired to reverse the crimping movements this may be achieved, as illustrated by the arcuate arrow in Figure 12, simply by adjusting ring 68 through an arc of rotation of 90°, so that its studs 69, instead of abutting screws 72 in their upward movement, abut screws 72′.

While the invention has been described specifically in relation to only two embodiments, persons skilled in the art will be aware that it may be refined or modified in various ways. We therefore wish it to be understood that this invention is not to be limited in interpretation except by the scope of the following claims.

I claim:

1. In a crimping device, the combination comprising a flat support for a crimping member, a crimping member having a flat surface mounted for rotation on said support and having a pair of holes on opposite sides of its axis to receive ends of wires to be crimped, said holes being normally aligned with underlying holes in said support, and means for rotating said crimping member about its axis upon said support to sever portions of wire members projecting through the holes in said crimping member into the underlying holes in said support, and to crimp wire members received in said holes into substantially opposite directions simultaneously.

2. In a crimping device, the combination comprising a flat support for a crimping member, a crimping member having a flat surface mounted for rotation on said support and having a pair of holes on opposite sides of its axis to receive ends of wires to be crimped, said holes being normally aligned with underlying holes extending through said support, and means for rotating said crimping member about its axis upon said support to sever portions of wire members projecting through the holes in said crimping member into the underlying holes in said support, and to crimp wire members received in said holes into substantially opposite directions simultaneously.

3. Apparatus for inserting electrical components in panels having metallic conductors thereon, comprising a support for a crimping member; a crimping member mounted on said support for rotation parallel to one of said panels, said crimping member having a pair of holes disposed in opposite sides of and extending parallel to the axis of said rotation to receive ends of component lead wires extending through the panel and to crimp them against the conductors; spacing means upstanding from the crimping member for contact with the panel; and means for rotating the crimping member about said axis, upon said support, to crimp the wire ends received in said holes into substantially opposite directions.

4. Apparatus as described in claim 3 wherein said spacing means comprises an annular flange upstanding from said crimping member and surrounding said holes.

References Cited in the file of this patent

UNITED STATES PATENTS

| | | |
|---|---|---|
| 136,340 | Shorey | Feb. 25, 1873 |
| 397,267 | Ashworth | Feb. 5, 1889 |
| 1,559,966 | Kinch | Nov. 3, 1925 |
| 2,628,270 | Himmel | Feb. 10, 1953 |
| 2,633,526 | Snyder | Mar. 31, 1953 |
| 2,640,986 | Blumensaadt et al. | June 9, 1953 |
| 2,726,394 | Lowell | Dec. 13, 1955 |
| 2,746,041 | Heeley | May 22, 1956 |